(12) United States Patent
Stevens

(10) Patent No.: US 7,136,554 B1
(45) Date of Patent: Nov. 14, 2006

(54) POST-PACKAGING OPTICAL COUPLING

(75) Inventor: Rick C. Stevens, Apple Valley, MN (US)

(73) Assignee: Lockheed Martin Corporation, Eagan, MN (US)

( * ) Notice: Subject to any disclaimer, the term of this patent is extended or adjusted under 35 U.S.C. 154(b) by 181 days.

(21) Appl. No.: 10/613,809

(22) Filed: Jul. 3, 2003

(51) Int. Cl.
*G02B 6/26* (2006.01)

(52) U.S. Cl. .............................. 385/39; 385/92; 385/25

(58) Field of Classification Search ................. 385/39, 385/52, 88–94, 25, 31, 140
See application file for complete search history.

(56) References Cited

U.S. PATENT DOCUMENTS

| | | | |
|---|---|---|---|
| 5,774,604 A * | 6/1998 | McDonald .................... 385/18 |
| 6,188,814 B1 * | 2/2001 | Bhalla .......................... 385/15 |
| 6,253,005 B1 * | 6/2001 | Bergmann et al. ............ 385/33 |
| 6,502,999 B1 * | 1/2003 | Cohen et al. .................. 385/94 |
| 6,580,858 B1 * | 6/2003 | Chen et al. .................... 385/48 |
| 6,735,355 B1 * | 5/2004 | Wu et al. ....................... 385/18 |
| 2005/0135742 A1* | 6/2005 | Basavanhally et al. ....... 385/33 |

* cited by examiner

*Primary Examiner*—Rodney Bovermick
*Assistant Examiner*—Mike Stahl
(74) *Attorney, Agent, or Firm*—Jacobson & Johnson

(57) ABSTRACT

An optical coupling and a method of making an optical coupling where the alignment of the optical beam between two optical ports is completed after the optical coupling is assembled or packaged for shipment through the repositioning of a collecting mirror which is interposed to intercept an optical beam from an optical beam transmitter and then reflect the optical beam onto an optical beam receptor without an operator having to move or align either the optical beam transmitter or the optical beam receptor.

9 Claims, 2 Drawing Sheets

POST-PACKAGING OPTICAL COUPLING

FIELD OF THE INVENTION

This invention relates generally to an optical coupling and, more specifically, to an optical coupling and a post-packaging optical coupling method wherein the alignment of the optical members can be completed after packaging the optical coupling.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

Optical coupling devices are known in the art. Coupling devices are used to couple the output of one device to another device so that one can transmit an optical signal from one device to another device. Generally, to ensure that the optical signal can be transmitted from one optical element to another optical element the optical elements must be precisely aligned with each other by carefully positioning either or both of the optical elements so that an optical signal can travel from one of the optical elements to the other optical element or vice versa. As the optical elements, such as optical conductors, have a diameter about equal to the width of a human hair it is time consuming, difficult and costly to precisely align two optical elements during the manufacture of an optical coupling device. In addition, the optical alignment of the optical elements usually requires use of bulky alignment equipment during the manufacturing process of the optical coupling thus adding to the difficulty in the manufacture of an optical coupled device since the aligning equipment must be monitored as well as the position of each of the optical elements to ensure that when the optical coupling is assembled the optical coupling works properly. If, after assembly the optical coupling does not properly transmit the optical signal from one optical element to another optical element it is quite likely that the optical connector will have to be discarded.

The present process comprises a post-packaging alignable optical coupling and a post-packaging optical coupling method wherein the optical elements are assembled and affixed in position in relation to a positionable mirror which has a larger surface area than the optical ports of the optical elements. By aligning the optical elements with a larger mirror it avoids the painstaking precision alignment of each of the optical elements in order to get an optical signal emanating from one optical element to be received by an optical element on another device or vice versa. In addition, the post-packaging alignment of the optical coupled members allows one to produce an optical coupling with a low profile as well as eliminate the need for use of bulky precision optical alignment equipment during the manufacturing process of the optical coupling. A further feature of the invention is, that, if for some reason the optically coupled elements become misaligned during use, such as due to environmental effects, one can on-the-go redirect the optical beam so that the two optical elements are again in optical communication with each other thus avoiding the need to replace an existing optical coupling.

SUMMARY OF THE INVENTION

Briefly, the present invention comprises an optical coupling and a method of making an optical coupling where the alignment of an optical beam between two optical ports is completed after the optical coupling is assembled through remotely repositioning a collecting mirror, which is interposed to intercept an optical beam from one of the optical elements, until the mirror reflects the optical beam onto another optical element thus avoiding the problem of having to move or align either of the optical elements with each other in order to obtain optical communication in the optical coupling.

DESCRIPTION OF THE PREFERRED EMBODIMENT

Figure 1:
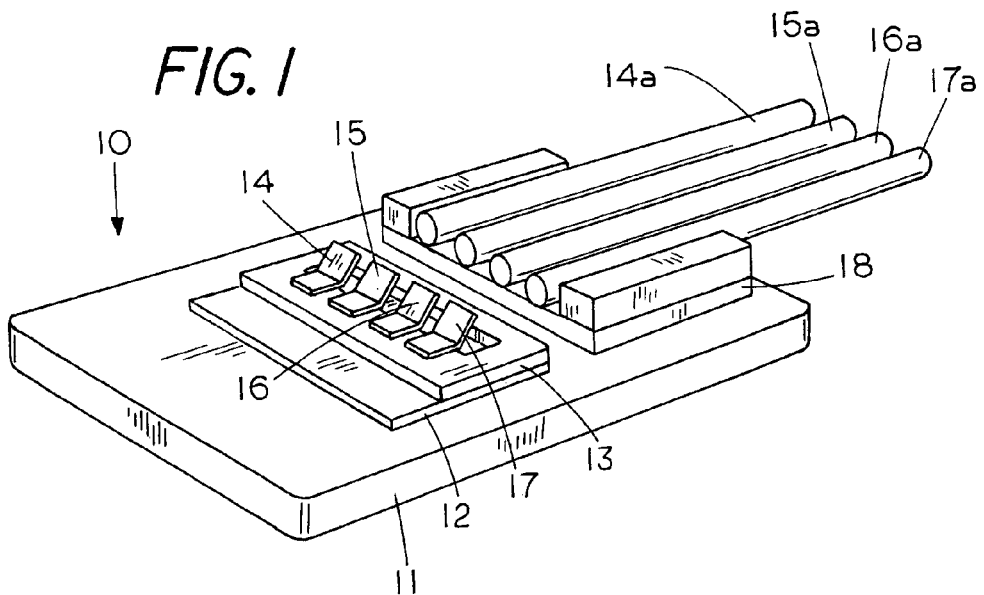
FIG. 1 is a perspective view of the optical coupling of the present invention.

FIG. 1 is a perspective view of an uncovered optical coupling 10 having a base 11 with an optical device 12 mounted on base 11 with the optical device 12 having a first set of four optical elements (not shown) that are to receive or transmit an optical signal. Optical coupling 10 also includes a second set of four optical elements comprising four optical conductors 14a, 15a, 16a, and 17a, which are also mounted on base 11. In manufacture of the optical coupling 10 it is desired to align each of the optical conductors with respect to each of the optical elements carried by the optical device 12 so that optical signals can be transmitted to and from each of the four optical elements in optical device 12 to each of the four optical conductors 14a, 15a, 16a, and 17a. However, such precision alignment of the optical beam during the manufacturing process is not only difficult but requires sophisticated equipment during the assembly or packaging process.

Included as part of the optical coupling of the present invention are four separate mirror positioning systems that are fixedly mounted to optical device 12 with the first positioning system including a first mirror 14 that is interposed to intercept and reflect an optical signal to or from optical connector 14a. The second positioning system includes a second mirror 15 that is interposed to intercept and reflect an optical signal to or from optical connector 15a. The third positioning system includes third mirror 16 that is interposed to intercept and reflect an optical signal to or from optical connector 16a and a fourth positioning system that includes a fourth mirror 17 that is interposed to intercept and reflect an optical signal to or from optical connector 17a.

In the embodiment shown each of the positioning system includes apparatus and controls that are removed from the base with the controls (not shown) enabling one to reposition the mirrors so that optic signals impinging on the mirrors can be redirected into the proper location. It should be pointed out that while four positionable mirrors are shown the invention can be used with one or more positionable mirrors.

As can be seen in FIG. 1, a holder 18, which is fixedly mounted to base 11 carries the set of four optical conductors 14a, 15a 16a and 17a which are also fixedly mounted to holder 18 and to base member 11 through an adhesive or the like. The optical conductor 14a is in general alignment with mirror 14 so that an optical signal emanating from optical conductor 14a impinges on mirror 14. Similarly, optical conductor 15a is in general alignment with mirror 15 so that an optical signal emanating from optical conductor 15a impinges on mirror 15, optical conductor 16a is in general alignment with mirror 16 so that an optical signal emanating from optical conductor 16a impinges on mirror 16 and optical conductor 17a is in general alignment with mirror 17 so that an optical signal emanating from optical conductor 17a impinges on mirror 17. Since each of the mirrors have a larger surface area than the optical ports in the optical elements receiving ports they are in effect large targets. As the mirrors for large targets relative to the size of the optical beams one can visually align the optical conductors so the optical beams impinge on the mirrors without the need for sophisticated alignment equipment. Because each of the mirrors are repositionable an optical beam impinging on the mirror can be directed into a smaller optical port solely through changing the position of the mirror to thereby alter the path of the optical signal reflected from the mirror.

FIG. 1 illustrates the first steps in a method of making an optical coupling 10 that comprises mounting an optical element 12 to a base 11; mounting a set of positionable mirrors 14, 15, 16 and 17 on base 12 through a supporting member 13 and optical element 12.

As part of the process of making an optical coupling one mounts an optical conductor such as optical conductors 14a, 15a, 16a and 17a to the base 11 through a holder 18. Both the optical conductors and the optical elements are fixedly mounted to base member 11 thus precluding an adjustment to the optical conductors to bring their respective optical signals into optical alignment between two optical ports.

In the first step of the present invention the optical conductors are fixedly positioned on the base 11 so that an optical signal emanating from each of the optical conductors impinges on the respective mirror associated with the optical conductor. For example, an optical signal emanating from optical conductor 14a would traverse the space between mirror 14 and the end of optical conductor 14a before impinging on mirror 14.

Figure 2:
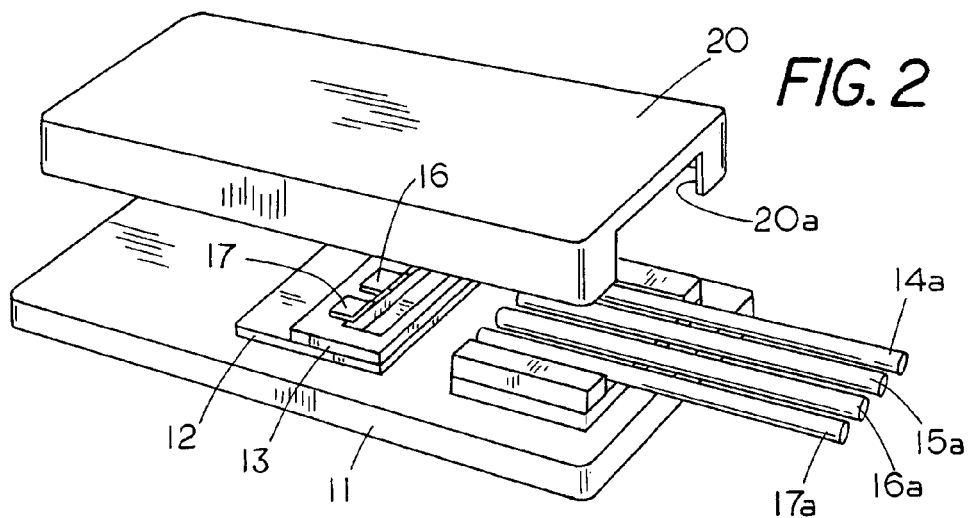
FIG. 2 is a perspective of the optical coupling of FIG. 1 as a shroud is about to be positioned thereover.

Referring to FIG. 2 there is shown as part of the method of packaging the optical coupling 10 for shipment one places a shroud 20 having a relief 20a over the optical device 12 and the mirrors 14–17 and at least a portion of the optical conductor 14a, 15a, 16a and 17a to form an enclosure that encapsulates and protects the exposed ends of optical conductors 14a, 15a, 16a and 17a as well as the optical elements located in optical device 12.

Figure 3:
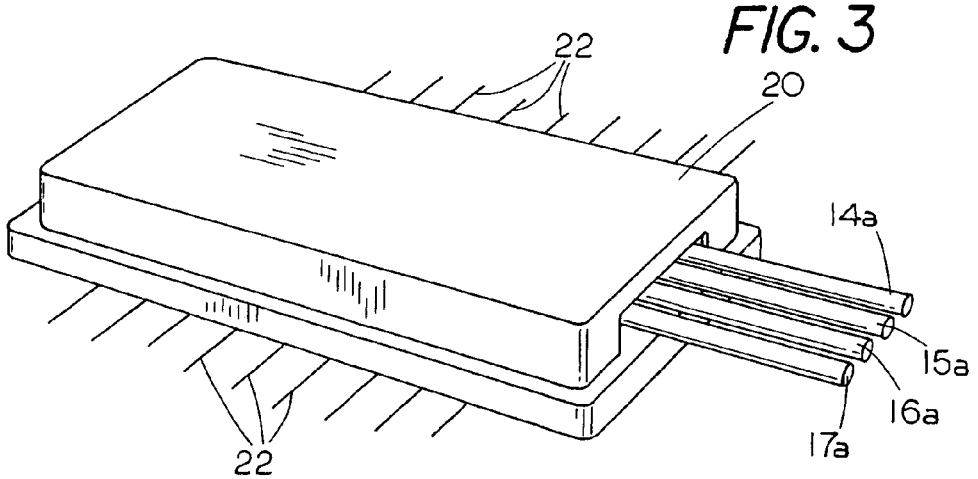
FIG. 3 is a perspective view of an assembled optical connector.

FIG. 3 shows a perspective view of optical coupling 10 with shroud 20 extending to base 11 to cover the optical path between the end of the optical conductor 14a, 15a, 16a, and 17a and the optical elements located in the optical element 12. Shroud 20 and base 11 coact to encapsulate and protect the optical receiving ports and the optical conductor. A set of leads 22 extend from base 11 at least some of which connect to the various mirror positioning systems to provide a location remote of the optical coupling where one can control the positions of the mirrors and hence the reflection of an optical beam therefrom.

One type of mirror positioning system usable for positioning small mirrors is known in the art as a MEMS actuator system. The MEMS (Micro Electro Mechanical Systems) actuator system is a miniature drive system that allows one to remotely reposition the mirrors 14, 15, 16 and 17 in optical coupling 10 much as one can remotely reposition the side view mirror on an automobile. The MEMS devices are micron scale mechanical devices formed by processing silicon in a manner similar to the layering used to form semiconductor devices. In the MEMS process, a mask is deposited and then silicon material is etched away to produce the MEMS actuator. While the MEMS system is especially well suited for use with the present invention other means, such as miniature motors, can be used for repositioning the mirror which is interposed in the light beam between the optically coupled devices.

With the assembled optical coupling 10 as shown in FIG. 3 there may or may not be an optical path from the ends of each of the optical conductors to each of the respective optical ports contained in optical element 12. Although the optical coupling may be in assembled condition with the optical elements therein in misalignment with each other the present invention allows one to use a post-packaging process to position the mirrors 14, 15, 16 and 17 so that they are in a position to reflect an optical signal from each of the optical ports in the optical element 12 to each of the optical conductors 14a, 15a, 16a and 17a and vice versa.

Figure 4:
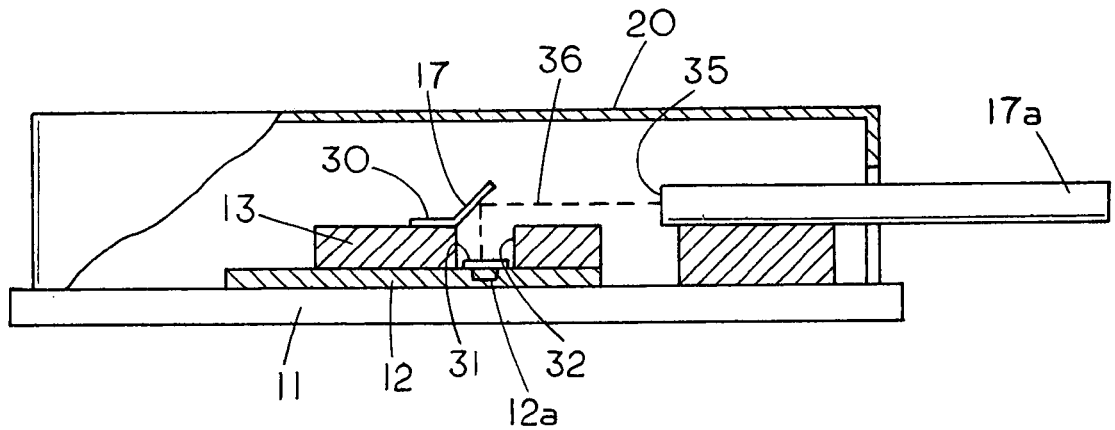
FIG. 4 is a cross sectional view of the optical coupling of FIGS. 1–3.

FIG. 4 shows a cross sectional view of optical coupling 10 with the shroud 20 partially cutaway to reveal the interior of the coupling 10. Within optical element 12 is an individual monolithic optical source or distribution subelement 12a, which could for example be a laser or photo diode. An optical interface port 31 allows one to receive or send optical signals therethrough. optical interface port 31 can be a lens used to aid in the optical alignment between the sub-optical element 12a and the optical conductor 17a. Located above optical device 12 is a member 13 having an opening 32 extending therethrough. Cantileverly positioned above opening 32 is mirror 17 which is located at an angle of about 45° to an optical signal 36 emanating from optical conductor 17a. The optical conductor 17a has an end face 35 and is shown with an optical beam 36 (dashed line) extending from the end face 35 to the mirror 17 which reflects the light beam downward through interface port 31 to the optical subelement 12a complete the transmission of the optical signal from the optical conductor 17a to the optical subelement 12a or vice versa.

In the present invention the optical conductors 17a, 16a, 15a and 14a are fixedly mounted on base 11 through a holder 18 and the optical element 12 is also fixedly mounted on base 11 with an optical subelement 12a and three additional optical subelements (not shown) located at a right angle to the end face 35 of the respective optical conductors. In order to cause the optical signal 36 to travel from the optical conductor 17a to the optical port 31 one repositions the mirror 17 so that the reflected light beam 36 impinges on subelement 12a. One repeats the process with mirrors 14, 15 and 16 with their respective optical conductors and optical subelements to align the remaining optical signals.

In the present process the fixed mounting of the optical conductor 17a as well as the optical element are such that a reflection and redirection of the optical beam 36 is required to make the optical connection between optical elements. By using positionable mirrors one can fixedly adhere the optical conductor 17a to base 11 via holder 18 and fixedly adhere the optical device 12 to base 11 thereby simplifying the manufacturing process. Once secured in position one can use a motor drive 30 (FIG. 4) to reposition mirror 17 so that the optical beam 36 is reflected off the mirror 17 and directly into optical subelement 12a via optical port 31 or vice versa.

Figure 5:
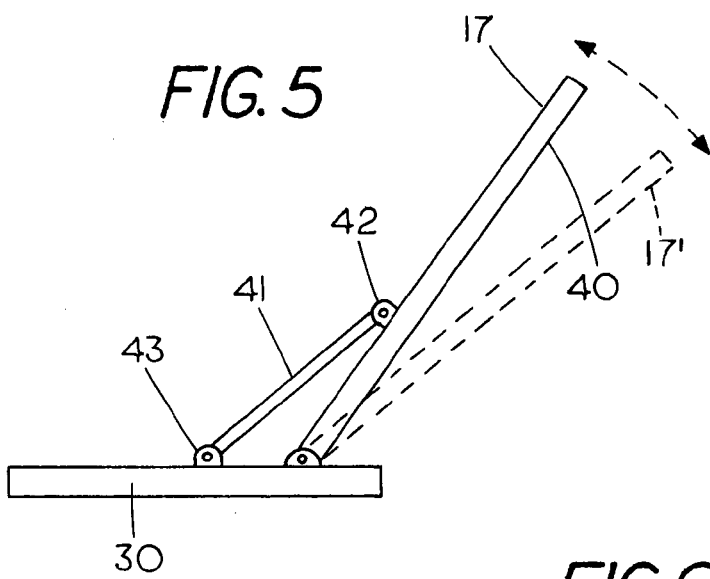
FIG. 5 is a semi-schematic of a system for tilting a mirror in the system.

A reference to FIG. 5 shows a semi-schematic of a system for redirecting the optical signal with the system including a pivotable mounted mirror 17 with a reflective surface 40 on one side. The mirror 17 is pivotally mounted to a base 30 and cantilevers outward past the edge of base 30. An extendible and contractable link 41, which has one end pivotally connected to base 30 by mount 43, and the other end pivotally connected to mirror 17 by mount 42 permits tilting of mirror 17. The dotted lines 17' indicate how a lengthening of the member 41 causes the mirror 17 to be displaced from its original condition. Similarly, a contraction of link 41 causes the mirror 17 to pivot in the opposite direction. Link 41 can be extended or contracted by an electrical motor (not shown) which can be controlled through leads 22 that extend outside of optical coupling 10. While FIG. 5 illustrates one particular method for development of the pivotable mounted mirror, there are various other techniques that can be applied to create the same functional alignment.

Figure 6:
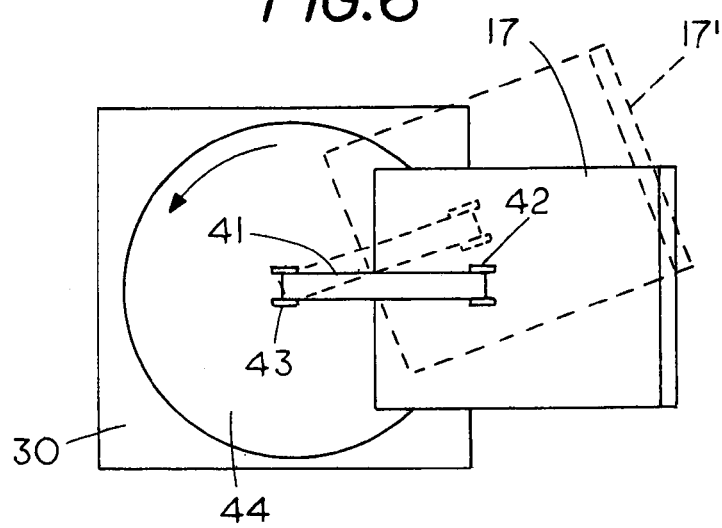
FIG. 6 is a semi-schematic of a system for remotely rotating a mirror in the system.

A reference to FIG. 6 shows a top view of the device of FIG. 5 showing that the mirror 14 can also be rotated by rotating an insert 44, such as with an electric motor (not shown), to move the mirror 14 as indicated by the dotted lines. Thus the mechanism shown and described in FIG. 5 and FIG. 6 provides for repositioning the mirror so that one can direct a misaligned optical beam into the proper optical port through changing the angle of incidence of the optical beam on mirror 17. If desired one can place a curvature into the mirror to permit the mirror to refocus the optical beam as it transmits the optical beam to the optical receptor.

In the devices shown in FIG. 5 and FIG. 6 the lengthening and contraction member 41 or the rotation of member 44 can be controlled from a site outside of the optical coupling through the leads 22 extending from optical coupling to a control module (not shown).

As used herein the term optical device is used to describe a device having an optical port or an optical subelement component like a laser or photo diode that needs to be in optical communication with another optical port. Instead of positioning one or the other ports so that an optical signal can travel directly from one optical port to another optical port one interposes a mirror having a reflective surface in the path of the optical beam so that one can reflect the optical signal into the proper optical port. The mirror that is interposed in the path of the optical light beam is positionable through a mechanical device including an electric motor as illustrated in FIG. 5 and FIG. 6 or alternately through a MEMS actuator system. As a result, one can remotely i.e. from a site removed from the base reposition the mirror until the optical beam is directed onto the proper optical port. Thus one can package an optical coupling without the optical coupling being in an optical transmitting condition but through post-packaging positioning of the mirrors one can perform optical coupling even though the optical signal after packaging was in misalignment with the optical port as a result of the manufacturing process. As a result the post-packaging activation of the optical coupling can be achieved by repositioning the mirror to bring the optical signal into optical alignment through offsite mirror positioning controls.

I claim:

1. A post packaging alignable optical coupling comprising:
    a base;
    a first optical element for receiving or transmitting an optical signal, said first optical element located in a fixed condition on said base;
    a second optical element fixedly mounted to the base for receiving or transmitting an optical signal wherein at least one of the optical elements is an optical fiber or optical waveguide;
    a mirror interposed to directly intercept an optical signal from one or the other of said optical elements, said mirror moveably disposed with respect to said base;
    a MEMS actuator, said MEMS actuator supporting said mirror to enable repositioning said mirror to thereby direct the optical signal directly intercepted by said mirror from said first optical element into alignment with said second optical element or vice versa; and
    a shroud encompassing said optical elements with a free space located between said optical elements to therein enable remotely repositioning the mirror with the MEMS actuator when the shroud extends over the optical elements.

2. The optical coupling of claim 1 wherein the first optical element and the second optical element are located in a transverse condition from each other.

3. The optical coupling of claim 2 wherein the first optical element and the second optical element are located at substantially a right angle to each other.

4. The optical coupling of claim 1 wherein the optical coupling includes at least four optical elements.

5. A method of packaging an optical coupling comprising:
    fixedly mounting a first optical element to a base wherein the first optical element comprises an optical conductor;
    mounting a positionable mirror on said base so that an optical signal from the first optical element directly impinges on the positionable mirror;
    mounting a second optical element to the base;
    placing a shroud over the optical elements and the mirror and at least a portion of the optical conductor to form an enclosure; and
    repositioning the mirror after the optical coupling is packaged to bring the optical signal directly impinging the positionable mirror from the first optical element into alignment with the second optical element or vice versa.

6. The method of claim 5 wherein the repositioning of the mirror to align an optical signal from said first optical element to said second optical element is done through rotation and tilting the mirror.

7. The method of claim 5 including mounting a third optical element to said base and mounting a fourth optical element to said base and mounting a further repositionable mirror therebetween to thereby permit alignment of a further optical signal between said third optical element to said fourth optical element by repositioning said further repositionable mirror.

8. The method of claim 5 wherein mounting the second optical element comprises fixedly mounting said second optical element to said base.

9. The method of claim 5 where a MEMS actuator is mounted to said base and to said mirror to enable remote positioning of said mirror to thereby bring an optical signal from said first optical element into alignment with said second optical element or vice versa.

* * * * *